United States Patent [19]

Hart

[11] Patent Number: 5,169,560
[45] Date of Patent: Dec. 8, 1992

[54] CONTROL OF FOAM IN HYDROCARBON FLUIDS

[75] Inventor: Paul R. Hart, The Woodlands, Tex.

[73] Assignee: Betz Laboratories, Inc., Trevose, Pa.

[21] Appl. No.: 583,884

[22] Filed: Sep. 17, 1990

[51] Int. Cl.⁵ .................. B01D 19/02; B01B 1/02
[52] U.S. Cl. .................... 252/321; 252/358; 203/20; 201/9
[58] Field of Search .......... 252/321, 358; 203/20; 201/9; 106/472, 476; 208/184, 313, 347, 348

[56] References Cited

U.S. PATENT DOCUMENTS

| | | | |
|---|---|---|---|
| 2,603,599 | 7/1952 | Trautman | 252/321 |
| 2,813,077 | 11/1957 | Rogers et al. | 252/321 |
| 2,894,913 | 7/1959 | Sullivan et al. | 252/321 |
| 2,997,447 | 8/1961 | Russell et al. | 252/351 |
| 3,079,331 | 2/1963 | Gieseke | 252/321 |
| 3,723,342 | 3/1973 | Shane et al. | 252/358 |
| 3,751,373 | 8/1973 | Lieberman et al. | 252/321 |
| 3,844,351 | 10/1974 | Sutton et al. | 166/293 |
| 4,005,044 | 1/1977 | Raleigh | 252/358 |
| 4,082,690 | 4/1978 | Farminer | 252/321 |
| 4,342,797 | 8/1982 | Kober et al. | 427/220 |
| 4,380,459 | 4/1983 | Netting | 252/DIG. 2 |
| 4,505,716 | 3/1985 | Sawyer, Jr. | 44/51 |
| 4,642,330 | 2/1987 | Quinn | 252/34 |
| 4,874,641 | 10/1989 | Kittle | 252/321 |
| 5,034,508 | 7/1991 | Nishizaki et al. | 106/287.26 |

Primary Examiner—Robert L. Stoll
Assistant Examiner—C. Sayala
Attorney, Agent, or Firm—Alexander D. Ricci; Philip H. Von Neida

[57] ABSTRACT

A method and composition for foam control in non-aqueous systems utilizing sulfonate or phosphinate compounds. The method is especially well adapted for use in oil distillation units and coking of crude oil residues.

9 Claims, No Drawings

CONTROL OF FOAM IN HYDROCARBON FLUIDS

FIELD OF THE INVENTION

This invention relates to the control of foam in hydrocarbon fluids. Specifically, this invention relates to the control of foam in oil at the high temperatures that often occur during the distillation of crude oil or the coking of crude oil.

BACKGROUND OF THE INVENTION

The formation of foam is a most undesirable result in most industries as it has a direct and drastic effect upon production efficiency and accordingly the economics of a system or a process.

Foam can be created either chemically or mechanically and is the result of dispersions of gas in the liquid. The gas is the discontinuous phase in the continuous liquid phase. The gas makes up the larger portion of the foam and as a result, the bubbles are separated by a thin liquid film.

Foams can occur in diverse industrial fields. The problems they cause range from an unaesthetic appearance to foams that are actually hazardous. Foam problems are common in paper manufacturing, textile dyeing, phosphoric acid processes, photographic applications, fermentation, polymerization and distillation and oil refining. If not controlled, foam can decrease equipment capacity by occupying space designed for fluids or gases. This increases processing time and expense and can cause other system disadvantages, such as foamover, where the liquid that is supposed to stay in the bottom of the vessel is carried out the top by the foam.

Crude oil towers and cokers operating at high temperatures can produce foam in their hydrocarbon products which in turn diminishes the efficiency and effectiveness of the tower or coker, degrading the quality of the overhead products such as gasoline and gas oils.

All of the effective anti-foaming agents known in the industry are silicone (dimethyl polysiloxane) based.

One problem with the use of silicone-based defoamers is that they are expensive to use. Another problem that is significant to the oil industry is that using silicone-based defoamers poison downstream catalysts with silicon carryover and residues.

With the foregoing in mind, the present inventor embarked upon a comprehensive study in an attempt to obtain a foam controller that does not possess the limitations of silicone-based foam controllers.

Accordingly, it is an object of the present invention to provide a method of foam control of hydrocarbon fluids at high temperatures by the use of sulfonate or phosphonate compounds.

Further, it is an object of the present invention to control foam in a less expensive manner than silicone-based controllers.

Further still, it is an object of the present invention to use foam controllers that will not poison downstream catalysts in a hydrocarbon distillation system.

Other objects of the present invention will become apparent from the detailed description given herein.

GENERAL DESCRIPTION OF THE INVENTION

The present invention relates to the method of adding sulfonate or phosphonate compounds to a hydrocarbon fluid to prevent foaming. These compounds can be added directly to the source of foaming or upstream as the situation dictates.

The sulfonate and phosphonate compounds are particularly effective in high temperature (300°-1000° F.) hydrocarbon fluids such as those found in the distillation and coking of crude oils. These sulfonate and phosphonate compounds are less expensive than silicone-based compounds and are commercially available.

DESCRIPTION OF THE RELATED ART

U.S. Pat. No. 4,005,044 (Raleigh) discloses the use of a dimethylpolysiloxane fluid in the solution of an emulsifying agent as a defoamer. The patent indicates that silicone fluids are well known in the art of defoamers.

U.S. Pat. No. 3,723,342 (Shane et al.) discloses the use of calcium petroleum sulfonate as a spreading agent in an aqueous defoamer composition. The composition is primarily aliphatic diamide and a low viscosity mineral oil as the carrier for the defoaming agent. The calcium petroleum sulfonate acts primarily as a surfactant in the aqueous system.

U.S. Pat. No. 4,082,690 (Farminer) discloses an antifoam process for non-aqueous systems. His treatment agent is a composition of polydimethylsiloxane, siloxane resin and a hydrocarbon solvent.

U.S. Pat. No. 2,997,447 (Russell et al.) discloses sodium sulfonate compounds used as a surfactant with the defoaming compounds, acetylenic glycols.

U.S. Pat. No. 3,751,373 (Lieberman et al.) teaches a method and composition for controlling foam in aqueous systems, particularly in pulp and papermaking systems. The composition comprises a combination of a tallow fatty acid, a petroleum sulfonic acid, a mono or diester of polyethylene glycol and a water insoluble organic liquid. This composition is shown to act synergistically in aqueous systems when all four ingredients are used in conjunction with a spreading agent or surfactant. The preferred petroleum sulfonic acid or metallic salt thereof have molecular weights in the range of 400 to 900.

DETAILED DESCRIPTION OF THE INVENTION

The present invention relates to a composition and method of adding sulfonate or phosphonate compounds to a hydrocarbon fluid to prevent foaming. This foaming often occurs at high temperatures during the distillation of crude oils and the coking of crude oil residues. Surprisingly, the addition of sulfonate or phosphonate compounds to these systems breaks up the foam.

Particularly effective in controlling foaming are petroleum sodium sulfonate, petroleum calcium sulfonate, dodecylbenzene sulfonic acid, dinonyl naphthalene calcium sulfonate (acid form), dinonyl naphthalene calcium sulfonate (salt form), dodecyldiphenyl oxide disodium sulfonate, decyldiphenyl oxide di-sodium sulfonate, dioctyl sodium sulfosuccinate. Representative phosphonates include nonylphenate sulfide calcium phosphonate. All these compounds are commercially available.

These compounds are less expensive than silicone-based defoamers and do not contain the fouling silicon. These compounds can be administered as solutions which have concentrations from 0.1% to 100% active with 1 to 2% active as a convenient range.

This converts into a preferred usage rate of 1 to 100 ppm active for coker feeds and 10-1000 ppm active for crude towers. It is to be understood that the present invention is not limited by the dosage of the antifoam species.

The present inventor has discovered that a composition of finely divided carbon and organic sulfonate, particularly petroleum sodium sulfonate, will act effectively as an antifoamer. This composition works well with about 99 percent by weight ground coke added to the sulfonate. However, it is anticipated by the present inventor that this method will also be effective as a combination of organic sulfonates or phosphonates with other finely divided carbons such as graphite or carbon black, and at other ratios.

The following high temperature defoamer test is given by way of illustration and not by way of limitation.

A 500 ml borosilicate glass cylinder is charged with 250 ml coker feed as a sample. This sample is then sparged slowly (100-200 ml/min) with nitrogen using a submerged borosilicate tube with a fine pore fritted glass diffuser. The sample is then heated with an electrical mantle to the temperature of the refinery unit. This usually ranges from 700° to 900° F. for a coker and 500° to 700° F. for a crude tower.

As the sample approaches within 50 degrees of the testing temperature, the nitrogen flow is increased (200 to 1000 ml/min) to bring the foam height above the 500 ml mark. The defoamer is then added as a dilute solution (about 1% active) from a syringe of a known and measured weight at a rate which maintains the foam height at the 500 ml mark. The time of the first injection is recorded as the starting time.

After timing from 2 to 60 minutes, the syringe is reweighed and the usage amount is recorded. More accurate results can be obtained if longer testing times are employed.

Commercially available silicone (Union Carbide L-45 DMPS 1000 St and L-45 DMPS 600 St) is employed as the control agent. Commercially available aromatic solvent is employed as the blank.

The following results were obtained using a coker feed from a Midwestern refinery at a temperature of 800° F. and at a nitrogen flow rate of 900 ml/min.

| Defoaming Agent | Usage (in mg Active/Min) | | Number of Tests |
|---|---|---|---|
| | Mean* | SD* | |
| Petroleum Sodium Sulfonate | 0.57 | .46 | 1 for 2 min. |
| | | | 1 for 6 min. |
| Petroleum Calcium Sulfonate | 0.62 | .27 | 1 for 5 min. |
| | | | 1 for 30 min. |
| Dodecyl Benzene Sulfonic Acid | 0.70 | | 1 for 2 min. |
| Dinonyl Napthalene Calcium Sulfonate (Acid form) | 0.99 | .23 | 1 for 2 min. |
| | | | 1 for 6 min. |
| Dinonyl Naphthalene Calcium Sulfonate (Salt form) | 0.52 | .11 | 1 for 2 min. |
| | | | 1 for 6 min. |
| Dodecyldiphenyl oxide Disodium Sulfonate | 1.12 | | 1 for 2 min. |
| Decyldiphenyloxide Disodium Sulfonate | 0.81 | | 1 for 2 min. |
| Dioctyl Sodium Sulfosuccinate | 2.29 | .22 | 2 for 6 min. |
| Nonylphenate Sulfide Calcium Phosphonate | 0.61 | | 1 for 6 min. |
| Silicone (Control) | 0.12 | .05 | 3 for 2 min. |
| | | | 1 for 6 min. |
| | | | 1 for 30 min. |
| Aromatic Solvent | Foam cannot be controlled | | |

*Weighted by test duration

The following results were obtained using another coker feed from the same refinery at the same conditions. Test duration was 30 minutes.

| Defoaming Agent | Usage (in mg Active/Min) |
|---|---|
| Petroleum Sodium Sulfonate | 0.59 |
| L-45 DMPS 1000 St | 0.51 |

The following results were obtained using a coker feed from a Southern refinery at a temperature of 800° F. and at a nitrogen flow rate of 540 ml/min.

| Defoaming Agent | Usage (in mg Active/Min) | | Number of Tests |
|---|---|---|---|
| | Mean | SD | |
| Petroleum Sodium Sulfonate | 0.42 | | 1 for 6 min. |
| Dinonyl Naphthalene Calcium Sulfonate | 1.76 | | 1 for 6 min. |
| Silicone (Control) | 0.21 | .10 | 25 for 6 min. |
| Aromatic Solvent (Blank) | Foam cannot be controlled | | |

The following results were obtained using a different coker feed from the same refinery with the same conditions. Test duration was 30 minutes.

| Defoaming Agent | Usage (in mg Active/Min) |
|---|---|
| Petroleum Sodium Sulfonate | 0.52 |
| L-45 DMPS 1000 St | 0.37 |

The following results were obtained using a third coker feed from the same refinery at the same temperature but a higher nitrogen flow rate of 900 ml/min. The foam head control level wad kept at 400 ml instead of the standard 500 ml for 30 minutes.

| Defoaming Agent | Usage (in mg Active/minute) |
|---|---|
| Petroleum Sodium Sulfonate | 0.33 |
| L-45 DMPS 600 St | 0.06 |

The following results were obtained using a coker feed from a second Southern refinery at a temperature of 800° F. and at a nitrogen flow rate of 900 ml/min.

| Defoaming Agent | Usage (in mg Active/Min) | | Number of Tests |
|---|---|---|---|
| | Mean | SD | |
| Petroleum Sodium Sulfonate | 0.79 | 0.01 | 2 for 10 min. |
| L-45 DMPS 1000 St | 0.31 | .12 | 2 for 10 min. |

The following results were obtained using the same coker feed at a higher temperature range of 780°-890° F. and the same nitrogen flow rate for 20 minutes.

| Defoaming Agent | Usage (in mg Active/Min) |
|---|---|
| Petroleum Sodium Sulfonate | 0.75 |
| L-45 DMPS 600 St | 0.48 |

The following results were obtained using the same coker feed but with 4% ground coke added. A temperature of 800° to 850° F. and the same nitrogen flow was used. With the 4% ground coke added to the feed, the foam head would not even rise to the standard 500 ml mark. Instead, the foam head control level was kept at 400 ml for 3 to 5 minutes. In addition to suppressing the foam, the finely divided carbon increased the efficacy of the other non-silicone defoamer relative to the silicone, as shown below:

| Additional Defoamer Agent | With Coke Added (400 ml Control Level) Usage (in mg Active/min) | Without Coke Added (500 ml Control Level) Usage (in mg Active/min) |
| --- | --- | --- |
| Petroleum Sodium Sulfonate | 0.40 | 0.79 |
| L-45 DMPS 600 St | 0.30 | 0.31 |

These results indicate the synergistic effects of a composition of an organic sulfonate and finely divided carbon.

The following results were obtained using a coker feed from a third Southern refinery at a temperature of from 650°–880° F. and at a nitrogen flow rate of 100 ml/min. Test duration was 45 to 50 minutes. The fluid boiled wildly and had boiled dry by the time 880° F. was reached. It is thought that the liquid was more similar to crude tower feed than coker feed.

| Defoaming Agent | Usage (in mg Active/minute) |
| --- | --- |
| Petroleum Sodium Sulfonate | >7.0 |
| L-45 DMPS 600 St | 0.41 |
| L-45 DMPS 1000 St | 0.34 |

The following results were obtained using atmospheric crude tower feed from a Western refinery at a temperature of 600° F. and a nitrogen flow rate of 600 ml/min. The test duration was 30 minutes.

| Defoaming Agent | Usage (in mg Active/minute) |
| --- | --- |
| Petroleum Sodium Sulfonate | >7.0 |
| L-45 DMPS 600 St | 0.72 |
| L-45 DMPS 1000 St | 0.35 |

This fluid boiled rapidly above 600° F. Between 600° F. and 700° F., the demand for DMPS 1000 St rose from 0.25 to 45.3 mg active/minute before settling down to 3.35 mg at 750° F.

The following results were obtained using an atmospheric crude tower feed from a Southern refinery at a temperature of 580° F. and at a nitrogen flow rate of 630 ml/min. Test duration was 60 minutes.

| Defoaming Agent | Usage (in mg Active/minute) |
| --- | --- |
| Petroleum Sodium Sulfonate | 1.13 |
| L-45 DMPS 600 St | 0.06 |
| L-45 DMPS 1000 St | 0.04 |

These examples show that the sulfonate or phosphonate compounds are as effective as the silicone control agent.

While this invention has been described with respect to particular embodiments thereof, it is apparent that numerous other forms and modifications of this invention will be obvious to those skilled in the art.

I claim:

1. A composition for controlling foam in a non-aqueous system which comprises an organic sulfonate and finely divided carbon.

2. A composition as in claim 1 wherein the organic sulfonate is petroleum sodium sulfonate.

3. A composition as in claim 1 wherein the organic sulfonate is petroleum calcium sulfonate.

4. A composition as in claim 1 wherein the organic sulfonate is dinonyl napthalene calcium sulfonate.

5. A composition as in claim 1 wherein the organic sulfonate is dodecyldiphenyl oxide di-sodium sulfonate.

6. A composition as in claim 1 wherein the organic sulfonate is decyldiphenyl oxide di-sodium sulfonate.

7. A composition as in claim 1 wherein the organic sulfonate is dioctyl sodium sulfosuccinate.

8. A composition as in claim 1 wherein the finely divided carbon is coke.

9. A composition as in claim 1 wherein the finely divided carbon is graphite.

* * * * *